(12) United States Patent
Fabrizio et al.

(10) Patent No.: US 11,510,514 B2
(45) Date of Patent: Nov. 29, 2022

(54) DRINKING STRAW FOR MIXING AND DRINKING BEVERAGES

(71) Applicant: MYSTICAL INNOVATIONS, LLC, Trumbull, CT (US)

(72) Inventors: Dean Fabrizio, Trumbull, CT (US); Haralampos Moisiadis, Norwalk, CT (US)

(73) Assignee: MYSTICAL INNOVATIONS, LLC, Trumbull, CT (US)

( * ) Notice: Subject to any disclaimer, the term of this patent is extended or adjusted under 35 U.S.C. 154(b) by 0 days.

(21) Appl. No.: 16/127,472

(22) Filed: Sep. 11, 2018

(65) Prior Publication Data

US 2020/0077824 A1 Mar. 12, 2020

(51) Int. Cl.
*A47G 21/18* (2006.01)
*A47J 43/10* (2006.01)

(52) U.S. Cl.
CPC ......... *A47G 21/181* (2013.01); *A47J 43/1093* (2013.01)

(58) Field of Classification Search
CPC ....... A47G 19/00; A47G 21/181; B65D 77/28
USPC .............................. 239/12, 33, 289; 366/129
See application file for complete search history.

(56) References Cited

U.S. PATENT DOCUMENTS

| 3,776,458 | A | 12/1973 | Chunga, Sr. | |
|---|---|---|---|---|
| 7,731,101 | B2 * | 6/2010 | Fabrizio | A47J 43/1093 239/12 |
| 9,173,514 | B2 * | 11/2015 | Takumah | A47G 21/18 |
| 2008/0080299 | A1 * | 4/2008 | Takumah | A47G 21/18 366/129 |

* cited by examiner

*Primary Examiner* — Steven M Cernoch
(74) *Attorney, Agent, or Firm* — Ware, Fressola, Maguire & Barber LLP

(57) ABSTRACT

A drinking straw has an outer straw member having a lower portion, an upper portion having a top, and a mixing element, the mixing element having radially expandable and retractable vane members defined by two longitudinal slits, an upper hinge attached to the upper portion and a lower hinge attached to the lower portion and an inner straw member located internal to said outer straw member, the inner straw member having a bottom and a top, wherein the lower portion of the outer straw member is attached to the inner straw member, the outer straw member movable between a retracted position and a deployed position where stop portions of both straw members engage with each other so that the mixing element vane members radially extend away from the inner straw member and wherein the vane members retract when the outer straw member is in its retracted position.

17 Claims, 4 Drawing Sheets

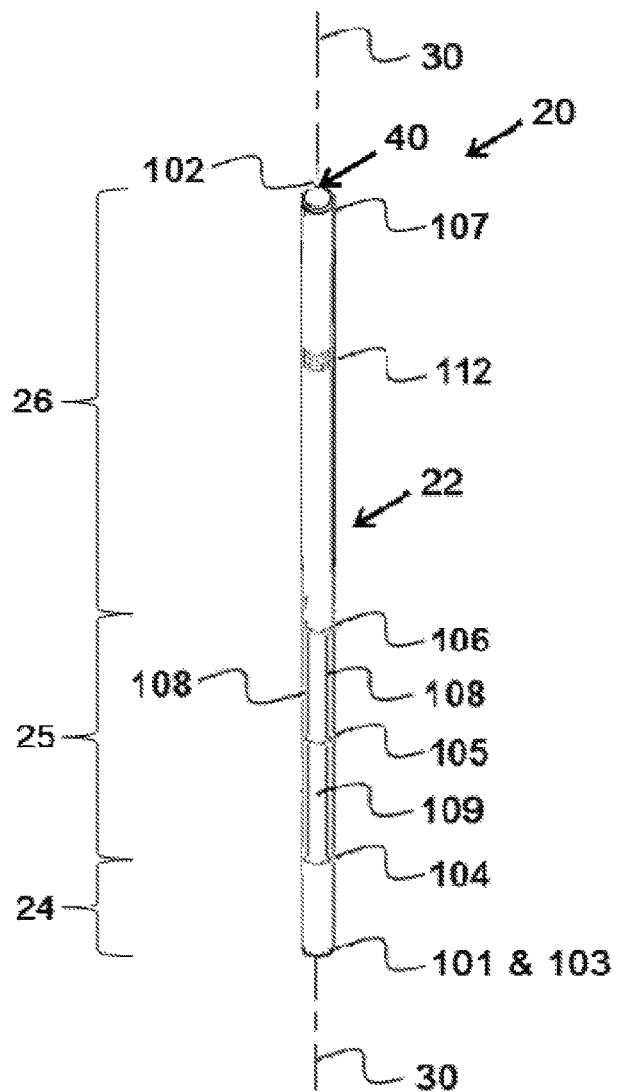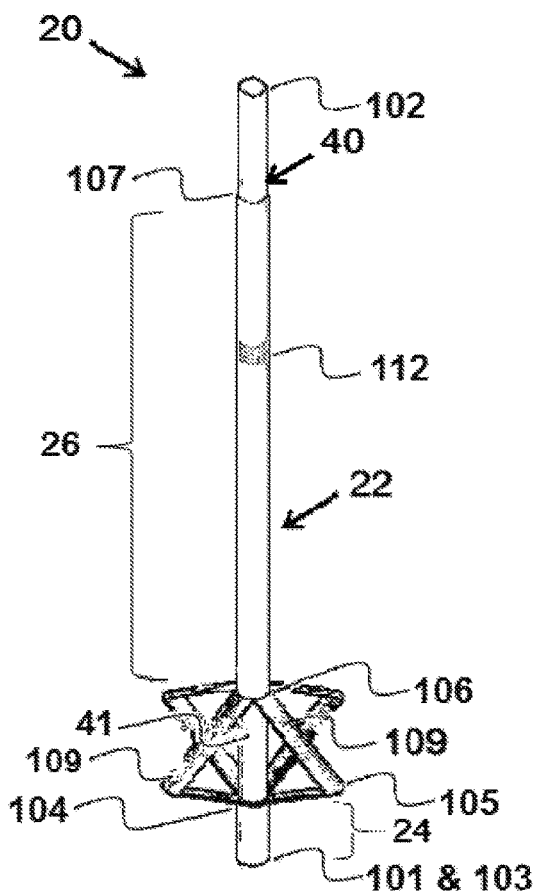
FIG. 2A
FIG. 2B

DRINKING STRAW FOR MIXING AND DRINKING BEVERAGES

TECHNICAL FIELD

The present invention relates in general to drinking straws, specifically, straws that can additionally mix a beverage within a container. It is also directed to a stirring device which can be used to stir other liquids, such as paint and the like.

BACKGROUND OF THE INVENTION

Drinking straws are well-known in the art. U.S. Pat. No. 7,731,101 discloses a straw apparatus for mixing and drinking beverages. It discloses radially expandable vane members which when deployed allow for mixing a beverage in which the straw is immersed. This mixing apparatus comprises expandable vane members which can be deployed so as to act as a mixing apparatus. However, once deployed, the mixing apparatus can be brought back to its undeployed state only by manual manipulation of the vane apparatus from its bottommost portion which thereby requires physical handling of the vane members. This, of course, results in the vane member needing to be removed from the liquid in which it is immersed.

The present invention when in a deployed position allows for mixing a beverage and when in a retracted position allows for normal drinking of the beverage by a user.

SUMMARY OF THE INVENTION

The present invention relates to a drinking straw comprising an outer straw member having a lower portion, an upper portion having a top, and a mixing element, the mixing element having a plurality of radially expandable and retractable vane members orientated generally parallel to each other along a longitudinal axis of the outer straw member, wherein each of said vane members is defined by two longitudinal slits, an upper hinge attached to the outer straw member upper portion and a lower hinge attached to the outer straw member lower portion and an inner straw member located internal to said outer straw member, the inner straw member having a bottom and a top, wherein the lower portion of the outer straw member is attached to the inner straw member at or near the bottom of the inner straw member, wherein the inner straw member has a stop portion positioned on an outer periphery of the inner straw member and the upper portion of outer straw member has a stop portion positioned on an inner periphery of the upper portion of the outer straw member, the outer straw member movable relative to the inner straw member between a retracted position where the outer straw member is at a maximum length and a deployed position where the stop portions of the inner straw member and the outer straw member engage with each other so that the mixing element vane members radially extend away from the inner straw member and wherein the vane members retract when the outer straw member is in its retracted position and wherein the top of the inner straw member is at least coextensive with the top of upper portion of the outer straw member when the outer straw member is in its retracted position.

Another embodiment of the present invention is the drinking straw as described above, wherein the inner straw member and outer straw member are tubular.

Another embodiment of the present invention is the drinking straw as described above, wherein each vane member of said outer straw member has a width from about 1% to 3% of an overall length of the outer straw member.

A further embodiment of the present invention is the drinking straw as described above, wherein the outer straw member and the inner straw member are fabricated from plastic.

A further embodiment of the present invention is the drinking straw as described above, wherein the lower portion of the outer straw member is attached to the inner straw member by crimping, gluing or sonic welding.

Another embodiment of the present invention is the drinking straw as described above, wherein the stop portion of the inner straw member comprises radially outwardly extending ridges and wherein the stop portion of the outer straw member comprises radially inwardly extending ridges.

Another embodiment of the present invention is the drinking straw as described above, wherein each vane member has a crimped region approximately midway along a length of the vane members so as to facilitate radial extension of the vane member when the outer straw member is in the deployed position.

A further embodiment of the present invention is the drinking straw as described above, wherein the inner straw member and outer straw member each have a square cross-sectional configuration.

Another embodiment of the present invention is a stirring apparatus comprising an outer member having a lower portion, an upper portion having a top, and a mixing element, the mixing element having a plurality of radially expandable and retractable vane members orientated generally parallel to each other along a longitudinal axis of the outer member, wherein each of said vane members is defined by two longitudinal slits, an upper hinge attached to the outer member upper portion and a lower hinge attached to the outer member lower portion and an inner member located internal to said outer member, the inner member having a bottom and a top, wherein the lower portion of the outer member is attached to the inner member at or near the bottom of the inner member, wherein the inner member has a stop portion positioned on an outer periphery of the inner member and the upper portion of outer member has a stop portion positioned on an inner periphery of the upper portion of the outer member, the outer member movable relative to the inner member between a retracted position where the outer member is at a maximum length and a deployed position where the stop portions of the inner member and the outer member engage with each other so that the mixing element vane members radially extend away from the inner member and wherein the vane members retract when the outer member is in its retracted position and wherein the top of the inner member is at least coextensive with the top of upper portion of the outer member when the outer member is in its retracted position.

Another embodiment of the present invention is the stirring apparatus as described above, wherein the inner member is solid.

Another embodiment of the present invention is the stirring apparatus as described above, wherein the inner member and outer member are fabricated from metal.

A further embodiment of the present invention is the stirring apparatus as described above, wherein the inner member and outer member are tubular.

BRIEF DESCRIPTION OF THE DRAWINGS

FIG. 2A is a perspective view of the drinking straw in its retracted position.

FIG. 2B is a perspective view of the drinking straw in its deployed position for mixing a beverage.

DETAILED DESCRIPTION

Figure 1A:
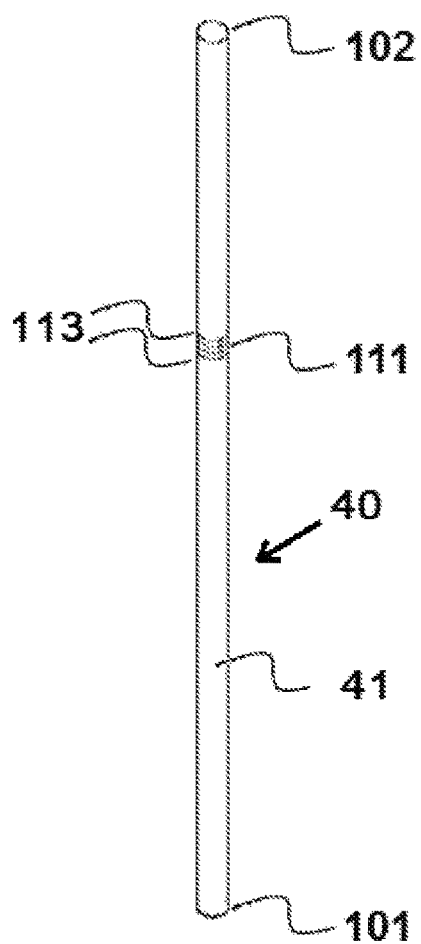
FIG. 1A is a perspective view of an inner straw member of a drinking straw according to the present invention.
Figure 1B:
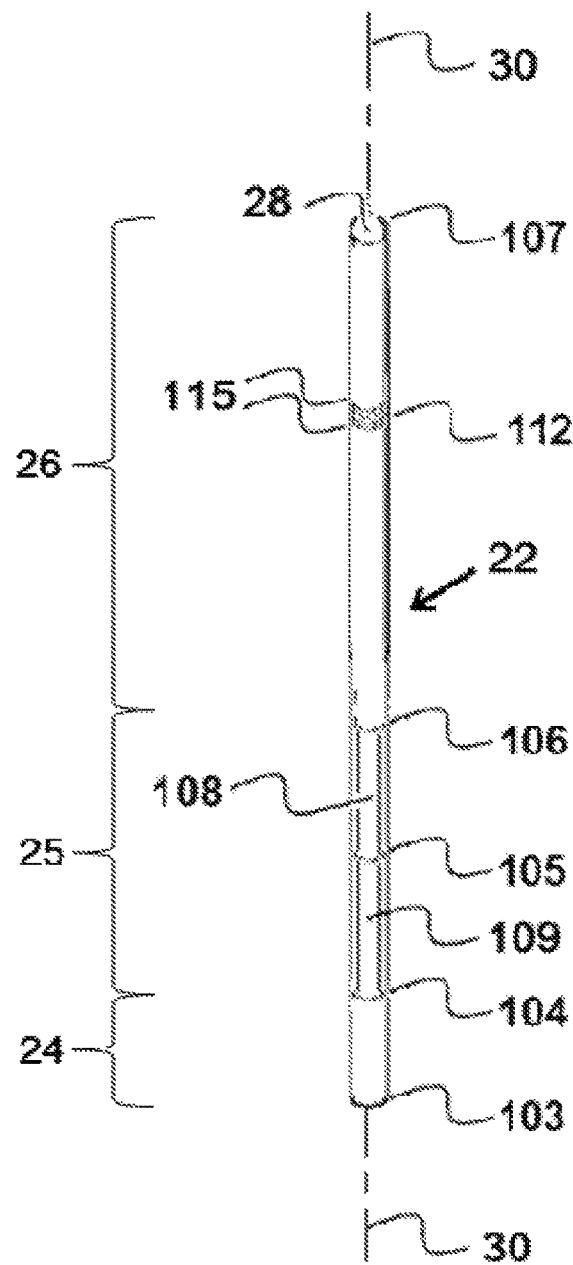
FIG. 1B is a perspective view of an outer straw member of a drinking straw according to the present invention.

FIG. 2A is a perspective view of a drinking straw 20 according to an embodiment of the present invention shown in its retracted position. The drinking straw 20 comprises an inner straw member 40 as seen in FIG. 1A and an outer straw member 22 as seen in FIG. 1B. The outer straw member has a lower portion 24, an upper portion 26 and a mixing element 25. The mixing element 25 has a plurality of radially expandable and retractable vane members 109. These vane members, as seen in FIG. 2A, are oriented generally parallel to each other along a longitudinal axis 30 of the outer straw member 22. Each of the vane members is defined by two longitudinal slits 108 formed in the outer straw member. Each vane member includes an upper hinge 106 attached to the outer straw member upper portion 26 and a lower hinge 104 attached to the outer straw member lower portion 24.

As seen in FIG. 2B, the vane members 109 radially extend away from the inner straw member 40 when the outer straw member is in a retracted position. The vane members may include a crimp region 105 positioned along a length of the vane member, preferably approximately midway along the length of the vane member. The crimp region facilitates radial extension of the vane member when the outer straw member is in the deployed position. This is seen in FIG. 2B. Although a crimped region is shown, the vane members do not require a crimp region, but may be formed so as to generally bow outwardly from the inner straw member 40 when the outer straw member is in the deployed position. This configuration is seen in FIG. 3.

Figure 3:
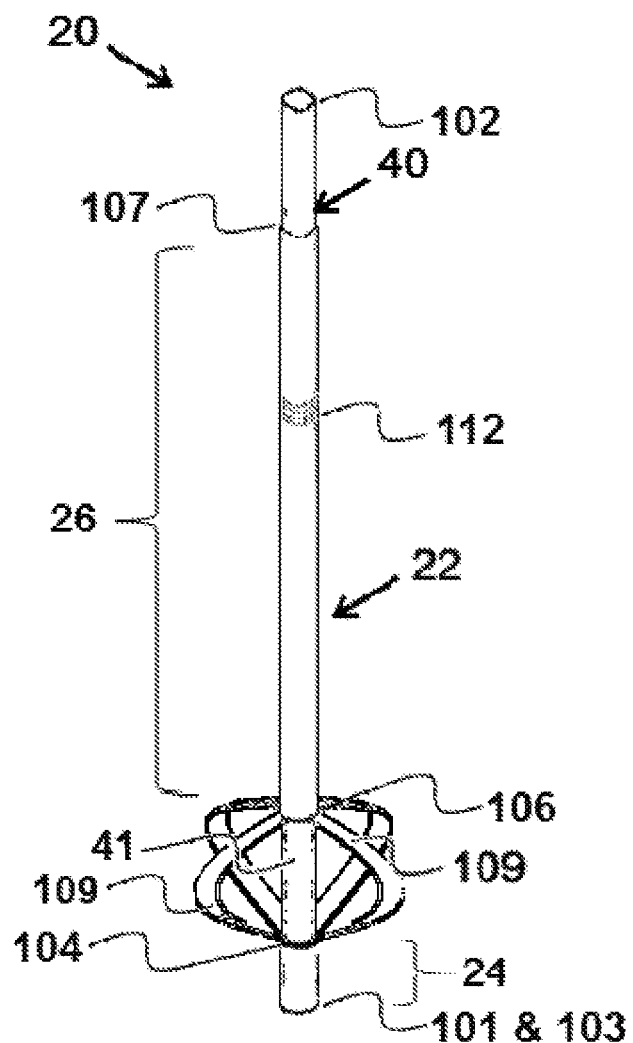
FIG. 3 is a perspective view of a second embodiment of the drinking straw.

The vane members may vary in number, with the embodiments of the invention shown in FIGS. 2B and 3 each having four vane members 109. In this embodiment, each vane member has a width approximately 1% to 3% of the overall length of the outer straw member.

As seen in FIGS. 2A and 2B, the inner straw member 40 is located internal relative to the outer straw member 22. The inner straw member has a bottom 101 and a top 102 and is hollow throughout its length. In the embodiment shown in FIGS. 1A-2B, the inner straw member is tubular in shape (a hollow cylinder through which liquid can be pulled via sucking at the top of the inner straw member). The inner straw member is preferably fabricated from plastic. The inner straw member includes a continuous outer periphery 41, as well as a stop portion 111 as best seen in FIG. 1A.

As seen in FIGS. 1B-2B, the outer straw member 22 is also tubular in configuration and has a bottom 103. The inner straw member and outer straw member are attached to each other at or near bottom 101 of the inner straw member and bottom 103 of the outer straw member. This attachment can be achieved by crimping the two bottoms, gluing the two bottoms, sonic welding the two bottoms or any other manufacturing technique known in the art. The outer straw member is also preferably fabricated from plastic.

The inner straw member stop portion 111 may comprise radially outwardly extending ridges 113 which can be formed in the inner straw member by a molding process of the inner straw member 40.

Similarly, the outer straw member 22 includes a stop portion 112 positioned in the upper portion 26 of the outer straw member. This stop portion 112 may comprise radially inwardly extending ridges 115 as best seen in FIGS. 1B and 2B. Stop portion 112 of the outer straw member is configured to engage with stop portion 111 of the inner straw member so as to define a deployed position of the outer straw member as seen in FIG. 2B for a first embodiment and FIG. 3 for a second embodiment. It is in this configuration that vane members 109 radially extend outwardly from the inner straw member 22.

Furthermore, as seen in FIG. 2A, as well as a comparison of the inner straw member 40 shown in FIG. 1A with the outer straw member 22 shown in FIG. 1B, the top 102 of the inner straw member is at least coextensive with the top 107 of the outer straw member when the drinking straw is in its retracted position as seen in FIG. 2A. As a result, the outer straw member 22 can be pulled back from its deployed position as seen in FIG. 2B to its retracted position as seen in FIG. 2A by a one-handed operation. Thus, the user only needs to pull up on the outer straw member upper portion relative to the inner straw member for the drinking straw to be pulled back to its retracted position. This is especially useful when the drinking straw is in a container with a beverage since the user can mix the beverage when the drinking straw is in the deployed position and then pull up on the outer straw member to bring the drinking straw to its retracted position without removing the straw from the beverage. Drinking through the straw can be achieved in the retracted position, the deployed position, and between these two positions.

Figure 4:
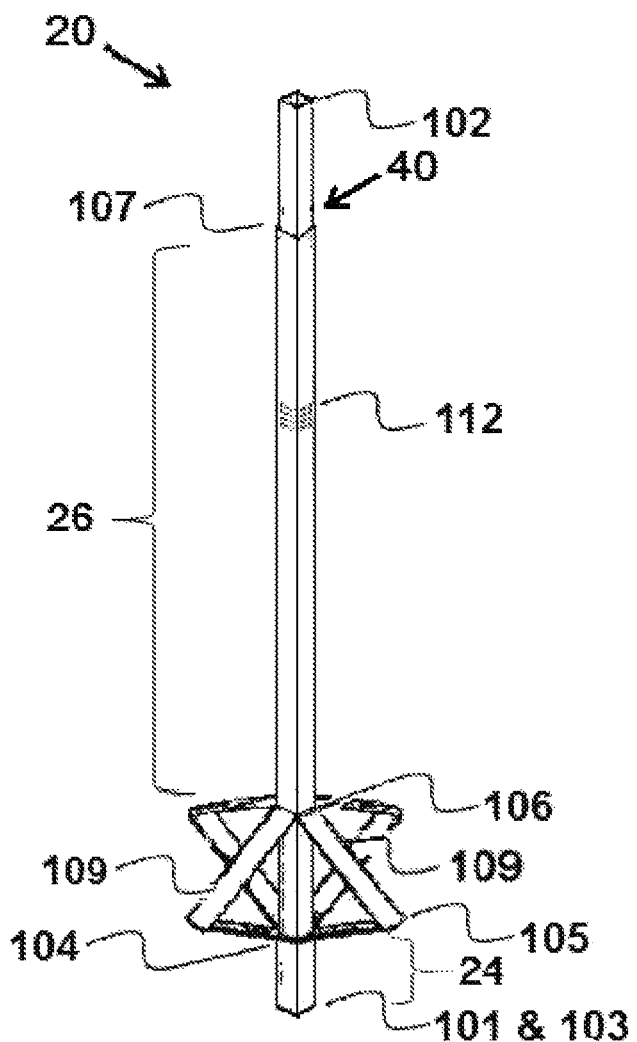
FIG. 4 is a perspective view of a third embodiment of the drinking straw, where the inner straw member and outer straw member each have square cross-sectional configurations.

As seen in FIGS. 1A-2B the inner straw member and the outer straw member are tubular in configuration for the embodiment shown. It is within the scope of the present invention that the inner straw member may have a non-circular cross-section, such as a rectangular cross-section with a corresponding rectangular cross-section for the outer straw member. Other configurations, of course, are possible as long as the inner straw member and the outer straw member have corresponding cross-sectional configurations. A square cross-sectional configuration is shown in FIG. 4.

A preferred material from which the inner straw member and outer straw member is fabricated is plastic as noted above (such as polypropylene), although other materials can be used, such as paper, cardboard and metal.

Thus, what has been described is a drinking straw having an outer straw member and an inner straw member, wherein the outer straw member is movable relative to the inner straw member between a retracted position, where the outer straw member is at a maximum length, and a deployed position, where stop portions on the inner straw member and outer straw member engage with each other so that mixing element vane members on the outer straw member radially extend away from the inner straw member, thereby providing for mixing of a beverage within which the drinking straw is located. Each embodiment of the present invention can be moved from its deployed position to its retracted position with a one hand operation and without the need of removing the straw from a container with a beverage therein.

Although the apparatus as described is in the configuration of a straw, the apparatus may be used as a stirring device for stirring other liquids, such as paint. In this embodiment, the inner straw member of the previous embodiment is an inner member and does not need to be hollow and may preferably be solid. The outer straw member of the previous embodiment is an outer member and is configured in the same manner as described above with respect to the drinking straw embodiment.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A drinking straw comprising:
an outer straw member comprising:
a lower portion comprising a bottom of the outer straw member,
an upper portion having a top corresponding to a top of the outer straw member, and
a mixing element disposed between the lower portion and the upper portion, and comprising a plurality of radially expandable and retractable vane members orientated substantially parallel to each other along a longitudinal axis of the outer straw member, wherein each of said vane members is defined by two longitudinal slits, an upper hinge attached to the outer straw member upper portion and a lower hinge attached to the outer straw member lower portion; and
an inner straw member located internal to said outer straw member, the inner straw member having a bottom and a top, the inner straw member having an overall length defined by a distance between said bottom and said top;
wherein the lower portion of the outer straw member is attached to the inner straw member at or near the bottom of the inner straw member;
wherein the inner straw member has a stop portion positioned on an outer periphery of the inner straw member and the upper portion of outer straw member has a stop portion positioned on an inner periphery of the upper portion of the outer straw member, the outer straw member movable relative to the inner straw member between a retracted position and a deployed position where the stop portions of the inner straw member and the outer straw member engage with each other so that the mixing element vane members radially extend away from the inner straw member and wherein the vane members retract when the outer straw member is in its retracted position;
wherein the top of the inner straw member is coextensive with the top of the upper portion of the outer straw member when the outer straw member is in its retracted position; and
wherein the drinking straw is configured to mix a beverage when the outer straw member is in the deployed position and the outer straw member can be pulled up by a user to bring the outer straw member to its retracted position without removing the drinking straw from the beverage.

2. The drinking straw according to claim 1, wherein the inner straw member and outer straw member are tubular.

3. The drinking straw according to claim 1, wherein each vane member of said outer straw member has a width from about 1% to 3% of an overall length of the outer straw member.

4. The drinking straw according to claim 1, wherein the outer straw member and the inner straw member are fabricated from plastic.

5. The drinking straw according to claim 4, wherein the lower portion of the outer straw member is attached to the inner straw member by crimping, gluing or sonic welding.

6. The drinking straw according to claim 1, wherein the lower portion of the outer straw member is attached to the inner straw member by crimping, gluing or sonic welding.

7. The drinking straw according to claim 1, wherein the stop portion of the inner straw member comprises radially outwardly extending ridges and wherein the stop portion of the outer straw member comprises radially inwardly extending ridges.

8. The drinking straw according to claim 1, wherein each vane member has a crimped region along a length of the vane members so as to facilitate radial extension of the vane member when the outer straw member is in the deployed position.

9. The drinking straw according to claim 8, wherein the crimped region of each vane member is midway along a length of the vane member.

10. The drinking straw according to claim 1, wherein the inner straw member and outer straw member each have a square cross-sectional configuration.

11. A stirring apparatus comprising:
an outer member comprising:
a lower portion comprising a bottom of the outer member,
an upper portion having a top corresponding to a top of the outer member, and
a mixing element disposed between the lower portion and the upper portion, and comprising a plurality of radially expandable and retractable vane members orientated substantially parallel to each other along a longitudinal axis of the outer member, wherein each of said vane members is defined by two longitudinal slits, an upper hinge attached to the outer member upper portion and a lower hinge attached to the outer member lower portion; and
an inner member located internal to said outer member, the inner member having a bottom and a top, the inner member having an overall length defined by the distance between said bottom and said top;
wherein the lower portion of the outer member is attached to the inner member at or near the bottom of the inner member;

wherein the inner member has a stop portion positioned on an outer periphery of the inner member and the upper portion of outer member has a stop portion positioned on an inner periphery of the upper portion of the outer member, the outer member movable relative to the inner member between a retracted position and a deployed position where the stop portions of the inner member and the outer member engage with each other so that the mixing element vane members radially extend away from the inner member and wherein the vane members retract when the outer member is in its retracted position; and wherein the top of the inner member is coextensive with the top of the upper portion of the outer member when the outer member is in its retracted position; and wherein the stirring apparatus is configured to mix a beverage when the outer member is in the deployed position and the outer member can be pulled up by the user to bring the outer member to its retracted position without removing the stirring apparatus from the beverage.

12. The stirring apparatus according to claim 11, wherein the inner member is solid.

13. The stirring apparatus according to claim 12, wherein the inner member and outer member are fabricated from metal.

14. The stirring apparatus according to claim 11, wherein the inner member and outer member are fabricated from metal.

15. The stirring apparatus according to claim 11, wherein the inner member and outer member are tubular.

16. A drinking straw comprising:
    an outer straw member comprising:
        a lower portion comprising a bottom of the outer straw member,
        an upper portion having a top corresponding to a top of the outer straw member, and
        a mixing element disposed between the lower portion and the upper portion, and comprising a plurality of radially expandable and retractable vane members orientated substantially parallel to each other along a longitudinal axis of the outer straw member, wherein each of said vane members is defined by two longitudinal slits, an upper hinge attached to the outer straw member upper portion and a lower hinge attached to the outer straw member lower portion; and an inner straw member located internal to said outer straw member, the inner straw member having a bottom and a top, the inner straw member having an overall length defined by the distance between said bottom and said top;

wherein the lower portion of the outer straw member is attached to the inner straw member at or near the bottom of the inner straw member;

wherein the outer straw member is movable relative to the inner straw member between a retracted position and a deployed position where the mixing element vane members radially extend away from the inner straw member and wherein the vane members retract when the outer straw member is in its retracted position; and wherein the top of the inner straw member is coextensive with the top of the upper portion of the outer straw member when the outer straw member is in its retracted position; and wherein the drinking straw is configured to mix a beverage when the outer straw member is in the deployed position and the outer straw member can be pulled up by the user to bring the outer straw member to its retracted position without removing the drinking straw from the beverage.

17. The drinking straw according to claim 16, wherein each vane member has a crimped region along a length of the vane members so as to facilitate radial extension of the vane member when the outer straw member is in the deployed position.

* * * * *